US009258278B2

(12) United States Patent
Zömbik

(10) Patent No.: US 9,258,278 B2
(45) Date of Patent: Feb. 9, 2016

(54) UNIDIRECTIONAL DEEP PACKET INSPECTION

(71) Applicant: Telefonaktiebolaget L M Ericsson (publ), Stockholm (SE)

(72) Inventor: Lászlo Zömbik, Zalaegerszeg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/436,741

(22) PCT Filed: Oct. 19, 2012

(86) PCT No.: PCT/EP2012/070793
§ 371 (c)(1),
(2) Date: Apr. 17, 2015

(87) PCT Pub. No.: WO2014/060046
PCT Pub. Date: Apr. 24, 2014

(65) Prior Publication Data
US 2015/0341317 A1    Nov. 26, 2015

(51) Int. Cl.
H04L 29/06    (2006.01)

(52) U.S. Cl.
CPC .......... *H04L 63/0245* (2013.01); *H04L 63/166* (2013.01); *H04L 63/205* (2013.01); *H04L 69/22* (2013.01)

(58) Field of Classification Search
CPC ......... H04L 63/04; H04L 63/08; H04L 63/20; H04L 63/205; H04L 9/08; G06F 2211/007; G06F 2221/2107
USPC .............................................. 713/151; 726/3
See application file for complete search history.

(56) References Cited

U.S. PATENT DOCUMENTS 7,778,194 B1    8/2010    Yung
8,316,429 B2 *  11/2012   Long ................... H04L 63/0236
                                                        713/154

(Continued)

FOREIGN PATENT DOCUMENTS

CA    EP 1895706 A1 *  3/2008  ............. H04L 63/04
EP    1895706 A1        3/2008

OTHER PUBLICATIONS

Dierks, T. et al., "The Transport Layer Security (TLS) Protocol Version 1.2", Network Working Group, Request for Comments: 5246, Aug. 2008, 1-104.
Freier, A. et al., "The Secure Sockets Layer (SSL) Protocol Version 3.0", Internet Engineering Task Force (IETF), Request for Comments: 6101, Aug. 2011, 1-67.

(Continued)

*Primary Examiner* — Samson Lemma
(74) *Attorney, Agent, or Firm* — Murphy, Bilak & Homiller, PLLC

(57) ABSTRACT

The invention relates to a communication device (1) comprising a processor configured to create a client handshake message in order to negotiate security settings for a network connection between the device and a network node (2) of the telecommunication network using a transport layer security protocol. The client handshake message comprises a first encryption algorithm indicator indicative of a first encryption algorithm proposed by the communication device for communication from the communication device (1) to the network node (2), and a second encryption algorithm indicator indicative of a second encryption algorithm proposed by the communication device for communication from the network node to the communication device (1). Only one of the first and second encryption algorithm indicator indicates that communication is non-encrypted while the other of the first and second encryption algorithm indicator is indicating that communication is encrypted. This enables e.g. a gateway to perform deep packet inspection in one direction while in the opposite direction the data is still safely encrypted.

13 Claims, 10 Drawing Sheets

(56) References Cited

U.S. PATENT DOCUMENTS

| | | | |
|---|---|---|---|
| 8,539,252 B2* | 9/2013 | Dellow | H04L 9/0637 380/277 |
| 8,566,590 B2* | 10/2013 | Oba | H04L 9/083 713/168 |
| 2007/0180510 A1 | 8/2007 | Long et al. | |
| 2010/0138910 A1* | 6/2010 | Aldor | H04L 63/0236 726/14 |

OTHER PUBLICATIONS

Harrison, R., "Lightweight Directory Access Protocol (LDAP): Authentication Methods and Security Mechanisms", Network Working Group, Request for Comments: 4513, Jun. 2006, 1-34.

Melnikov, A. et al., "Simple Authentication and Security Layer (SASL)", Network Working Group, Request for Comments: 4422, Jun. 2006, 1-33.

\* cited by examiner

UNIDIRECTIONAL DEEP PACKET INSPECTION

TECHNICAL FIELD

The invention relates to a communication device and network nodes in a telecommunication network. It also relates to methods of operating such devices and network nodes.

BACKGROUND

The Transport Layer Security (TLS) protocol and its predecessor, the Secure Sockets Layer (SSL) protocol, are cryptographic protocols that provide communication security over communication network such as the Internet. TLS and SSL encrypt the segments of network connections at the Application Layer for the Transport Layer, using asymmetric cryptographic functions for key exchange and peer entity authentication, symmetric encryption for confidentiality, and cryptographic hash functions in message authentication codes for message integrity.

The TLS protocol allows client-server applications to communicate across a network in a way designed to prevent eavesdropping and tampering. The TLS protocol is proven to be universal, since the TLS based FTPs, is an alternative for the SSH based sFTP/SCP. In addition to TLS and SSL, DTLS provides secure reliable communication even on unreliable transport as UDP, to give an alternative for IPSec.

For accessing and maintaining distributed directory information services over an Internet Protocol (IP) network, usually the Lightweight Directory Access Protocol (LDAP) is used. LDAP queries are sent by a client to a remote network node. In case LDAP queries are not covered by TLS, the entire protocol run can be read, thus the sensitive result of the LDAP query is visible for an attacker.

When TLS is used, the entire communication is encrypted. In such a situation a perimeter firewall cannot perform deep inspection of the requests to filter out unauthorized or unwanted requests. This issue is relevant for telecommunication nodes (including, but not limited to BSC, MSC, BTS, HLR, RNC, RBS, SGSN, GGSN eNB), when nodes start to use LDAP for user authentication and authorization in the management plane. As an example, the above mentioned nodes need to access the LDAP server of the OSS, which may contain sensitive information as well. In such cases, deep packet inspection of the requests at the perimeter is desirable, while the response should be well protected.

The above problem can be generalized to HTTPs and to FTPs protocols as well, where the requests need to be investigated and the response needs to be secured.

SUMMARY OF THE INVENTION

It is an object of the invention to improve the known communication systems described above.

Therefore, according to an aspect a communication device in a telecommunication network is provided comprising a processor configured to create a client handshake message in order to negotiate security settings for a network connection between the device and a network node of the telecommunication network using a transport layer security protocol. The client handshake message comprises:
  a first encryption algorithm indicator indicative of a first encryption algorithm proposed by the communication device for communication from the communication device to the network node, and
  a second encryption algorithm indicator indicative of a second encryption algorithm proposed by the communication device for communication from the network node to the communication device.

The communication device further comprises a transmitter configured to send the client handshake message to the network node. One of the first and second encryption algorithm indicator is indicating that communication is non-encrypted while the other of the first and second encryption algorithm indicator is indicating that communication is encrypted.

In an embodiment the client handshake comprises at least one cipher suite comprising the first and second encryption algorithm indicator. Alternatively, the client handshake message may comprise at least a first and a second information field, the first information field comprising at least the first encryption algorithm indicator, and the second information field comprising at least the second encryption algorithm indicator. In an embodiment, the processor is configured to encrypt communication device originated application data according to the first encryption algorithm indicator.

According to a further aspect, there is provided a network node in a telecommunication network, the network node comprising:
  a receiver for receiving a client handshake message from a communication device;
  a processor configured to process the client handshake message and create a server handshake message in order to negotiate security settings for a network connection between the communication device and the network node using a transport layer security protocol, the client handshake message comprising:
    a first encryption algorithm indicator indicative of a first encryption algorithm proposed by the communication device for communication from the client communication device to the network node, and
    a second encryption algorithm indicator indicative of a second encryption algorithm proposed by the communication device for communication from the network node to the client communication device.

One of the first and second encryption algorithm indicator is indicating that communication is non-encrypted while the other of the first and second encryption algorithm indicator is indicating that communication is encrypted, The server handshake message comprising the first and the second encryption algorithm indicator, The network node also comprises a transmitter configured to send the handshake message to the communication device.

In an embodiment, the processor is configured to encrypt server originated application data according to the second encryption algorithm indicator.

According to a further aspect there is provided a network node in a telecommunication network, the network node comprising:
  a receiver for receiving a server handshake message from a further network node;
  a processor configured to process the server handshake message, the server handshake message comprising:
    a first encryption algorithm indicator indicative of a first encryption algorithm proposed for communication from a communication device to the further network node, and
    a second encryption algorithm indicator indicative of a second encryption algorithm proposed for communication from the further network node to the communication device,
the processor being configured to check either the first or the second encryption algorithm indicator, and to block communication between the communication device and the further network node if the checked encryption algorithm indicator is indicating that communication is encrypted. The processor may be further configured to:
- receive application data from the communication device and/or from the further network node;
- perform data inspection of the application data;
- block the communication or alter the application data between the client communication device and the further network node if the application data is not conform some predefined inspection rules.

In an embodiment, the processor is configured to alter the application data by way of changing the content of the application data. The processor may also be configured to alter the application data by way of changing the routing information in the application data.

In an embodiment, the processor is further configured to receive a server certificate, retrieve an identity of the further network node from the server certificate, determine a client identity, and perform data inspection using the client identity and the server identity.

The processor may be further configured to check whether a client certificate is present in the server handshake message, and if so determine the client identity using the client certificate.

According to a further aspect there is provided a method of setting up a network connection between a communication device and a network node, the method comprising:
- creating a client handshake message in order to negotiate security settings for the network connection using a transport layer security protocol, the client handshake message comprising:
  - a first encryption algorithm indicator indicative of a first encryption algorithm proposed by the communication device for communication from the communication device to the network node, and
  - a second encryption algorithm indicator indicative of a second encryption algorithm proposed by the communication device for communication from the network node to the communication device,
- sending the client handshake message to the network node, wherein one of the first and second encryption algorithm indicator is indicating that communication is non-encrypted while the other of the first and second encryption algorithm indicator is indicating that communication is encrypted.

According to a further aspect there is provided a method of setting up a network connection between a communication device and a network node, the method comprising:
- receiving a client handshake message from the communication device;
- processing the client handshake message and
- creating a server handshake message in order to negotiate security settings for a network connection between the communication device and the network node using a transport layer security protocol, the client handshake message comprising:
  - a first encryption algorithm indicator indicative of a first encryption algorithm proposed by the communication device for communication from the client communication device to the network node, and
  - a second encryption algorithm indicator indicative of a second encryption algorithm proposed by the communication device for communication from the network node to the client communication device,
wherein one of the first and second encryption algorithm indicator is indicating that communication is non-encrypted while the other of the first and second encryption algorithm indicator is indicating that communication is encrypted, the server handshake message comprising the first and the second encryption algorithm indicator, the method further comprising:
- sending the handshake message to the communication device.

According to a further aspect there is provided a method of operating a network node in a telecommunication network, the method comprising:
- receiving a server handshake message from a further network node;
- processing the server handshake message, the server handshake message comprising:
  - a first encryption algorithm indicator (i.e. 'cipher') indicative of a first encryption algorithm proposed for communication from a communication device to the further network node, and
  - a second encryption algorithm indicator indicative of a second encryption algorithm proposed for communication from the further network node to the communication device,
- checking either the first or the second encryption algorithm indicator, and
- blocking communication between the communication device and the further network node if the checked encryption algorithm indicator is indicating that communication is encrypted.

According to a further aspect there is provided a telecommunication system comprising a communication device and a network node, the communication device being configured to create a client handshake message in order to negotiate security settings for a network connection between the device and a network node of the telecommunication network using a transport layer security protocol, the client handshake message comprising:
- a first encryption algorithm indicator indicative of a first encryption algorithm proposed by the communication device for communication from the communication device to the network node, and
- a second encryption algorithm indicator indicative of a second encryption algorithm proposed by the communication device for communication from the network node to the communication device,
the communication device further comprising a transmitter configured to send the client handshake message to the network node,
the network node being configured to receive the client handshake message, and create a server handshake message comprising the first and second encryption algorithm indicator, wherein one of the first and second encryption algorithm indicator is indicating that communication is non-encrypted while the other of the first and second encryption algorithm indicator is indicating that communication is encrypted.

The system may comprise a further node, e.g. a firewall or a gateway node, that is configured to:
- receive the server handshake message from the network node,
- process the server handshake message,
- check either the first or the second encryption algorithm indicator, and
- block communication between the communication device and the further network node if the checked encryption algorithm indicator is indicating that communication is encrypted.

DETAILED DESCRIPTION OF THE EMBODIMENTS

Figure 1:
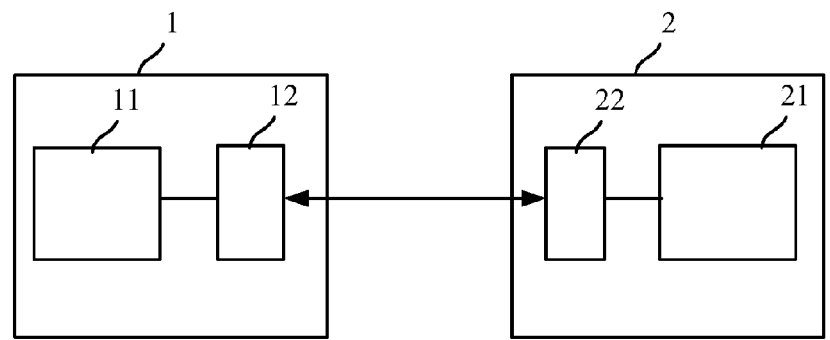
FIG. 1 schematically shows an exemplary embodiment of a communication device and a network node.

FIG. 1 schematically shows an exemplary embodiment of a communication device 1 and a network node 2 arranged to communicate with the communication device 1. The communication device 1 may be a user equipment (e.g. a mobile phone) or a network node in a telecommunication network. The communication device 1 comprises a processor 11 and I/O means 12. The network node 2 comprises a processor 21 and I/O means 22. Each of the I/O means 12 and 22 may comprise a receiver and transmitter arranged to set up a connection in order to communicate data between the communication device 1 and the network node 2. The processor 11 is arranged to execute a client application, such as a client side of an Internet application. The processor 12 of the network node 2 is arranged to execute a server application.

Figure 2:
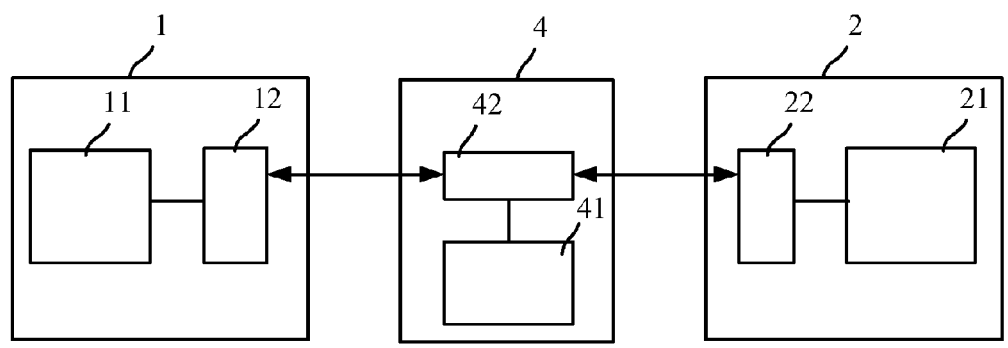
FIG. 2 schematically shows the communication device and the network node of the embodiment of FIG. 1 and a further network node arranged to function as a firewall.

FIG. 2 schematically shows the communication device 1 and a network node 2 of FIG. 1 and a further network node 4 arranged to function as a firewall. The network node 4 comprises a processor 41 and I/O means 42. Data received from the communication device 1 or from the network node 2 is processed by the processor 41 and forwarded depending on certain restrictions, as will be discussed below in detail.

When a data connection is established between the communication device 1 and the network node 2 of FIG. 1, first a handshaking occurs between a TLS client 100, running on the communication device 1, and a TLS server 102 running on the network node 2. Within this handshake, a ClientHello message and a ServerHello message are passed, see FIG. 3.

Figure 3:
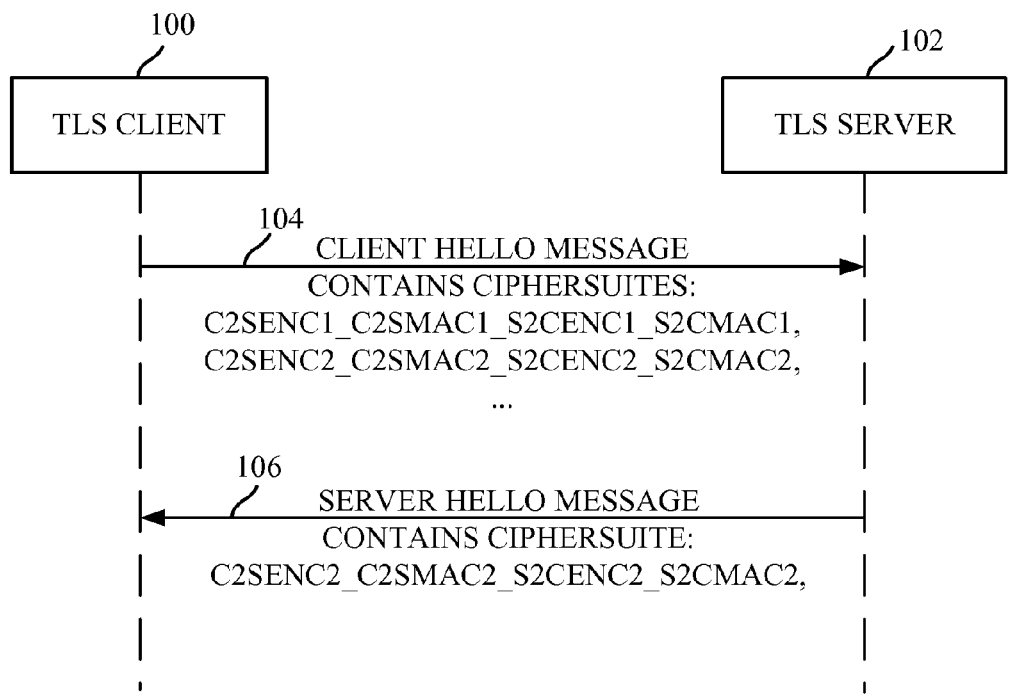
FIG. 3 is a sequence chart showing an example of a client/server handshake procedure using new cipher suites.

Note that, when the term TLS is used, then this should be interpreted for TLS1.0, TLS1.1, TLS1.2, SSLv3.0, DTLS1.0 or any future version of SSL, TLS or DTLS. According to an embodiment, the client handshake message 104 comprises at least one cipher suite comprising a first and second encryption algorithm indicator. The first encryption algorithm indicator, e.g. cipher C2SENC1, is indicative of a first encryption algorithm proposed by the communication device 1 for communication from the communication device 1 to the network node 2. The second encryption algorithm indicator, e.g. S2CENC1, is indicative of a second encryption algorithm proposed by the communication device 1 for communication from the network node 2 to the communication device 1. In the example of FIG. 3 the ClientHello message comprises a first ciphersuite called C2SENC1_C2SMAC1_S2CENC1_S2CMAC1 which indicates that the encryption from Client to Server direction is C2SENC1, the MAC algorithm Client to Server direction is indicated by C2SMAC1. Likewise, in the reverse direction, from Server to Client the encryption algorithm is indicated by S2CENC1, and the MAC algorithm is indicated by S2CMAC1. Similarly the C2SENC2_C2SMAC2_S2CENC2_S2CMAC2 defines a second ciphersuite which defines encryption and MAC algorithms in Client to Server and Server to Client directions.

According to an embodiment, one of the first and second encryption algorithm indicator is indicating that communication is non-encrypted while the other of the first and second encryption algorithm indicator is indicating that communication is encrypted. For example, the cipher suite:

C2SENC1_C2SMAC1_S2CENC1_S2CMAC1, may have the value WITH_NULL_SHA256_WITH_AES_256_CBC_SHA384, where WITH_NULL is representing the encryption algorithm in Client to Server direction, indicating that no encryption is proposed in the Client to Server direction. The cipher WITH_AES_256_CBC is representing the encryption algorithm from Server to Client direction. The cipher SHA256 is representing the MAC algorithm in client to server direction, and for the reverse direction, the MAC algorithm is SHA384.

The ciphersuite may also contain the protocol name, the authentication and the key exchange algorithms as well. In that case the above example is extended with TLS protocol, DHE and DSS to show an example ciphersuite:

TLS_DHE_DSS_WITH_NULL_SHA256_WITH_AES_256_CBC_SHA384

This cipher suite proposes that the protocol is TLS, the key exchange is Ephemeral DH signed by DSS. The client to server communication will not be encrypted, but in that direction the message integrity will be ensured with SHA256. In addition, the server to client communication will be encrypted using AES256 in CBC mode and the message integrity will be provided by SHA384.

Please note that in FIG. 3 the protocol name (SSLv2, SSLv3 or TLS), the authentication method (Anon, DSS or RSA), the key exchange method (RSA key transport, DH, DHE) are omitted for simplicity from the ciphersuites. In FIG. 3 only the encryption and MAC algorithms are expressed. Two encryption algorithms and two MAC algorithms are described, as these algorithms are used only in one direction.

In the case of defining new cipher suites the standard handshake protocol is not changed, only in the ClientHello message 104 a new ciphersuite is offered amongst other ciphersuites and the server 102 may select the new ciphersuite in the ServerHello message 106. This solution works with all current versions of SSL, TLS protocols. A further advantage of defining new cipher suites is that it is easy to create an extension RFC of the ciphersuites. The total number of ciphersuites is going to be multiplied with the product of the number of supportable encryption and message integrity algorithms. This implies that the IANA value for ciphersuites might be booked more extensively as compared to the known methods.

Figure 4:
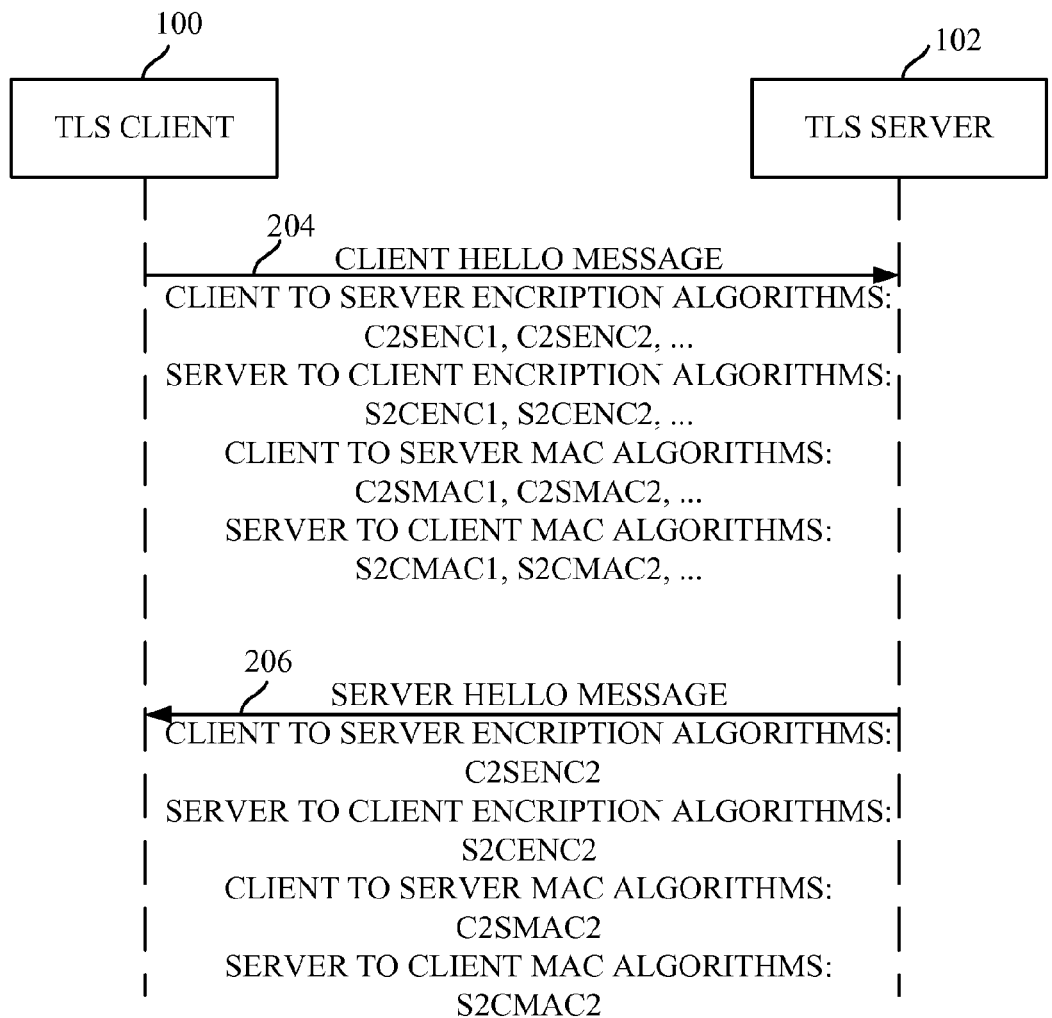
FIG. 4 is a sequence chart showing an example of a client/server handshake according to an alternative embodiment.

An alternative embodiment, TLS (and as earlier referred, SSL, DTLS) standard is modified so that the Hello messages 204, 206 are modified, see FIG. 4. In this embodiment, the ciphers are arranged apart in specific information fields e.g. for Key exchange client and server side, peer authentication method (signature algorithm) client and server side, encryption algorithms client and server side, hash algorithm client and server side. In FIG. 4 the selected algorithms in the ServerHello message 206 are as follows: for the encryption from Client to Server direction C2SENC2 is selected, for the MAC algorithm Client to Server direction C2SMAC2 is selected. Likewise, in the reverse direction, for the encryption from Server to Client S2CENC2 is selected, and for the MAC algorithm S2CMAC2 is selected. The IANA values for ciphersuites need not be used extensively with this solution, as with this solution, the number of ciphersuites will be proportional with the number of the encryption and message integrity algorithms.

Figure 5:
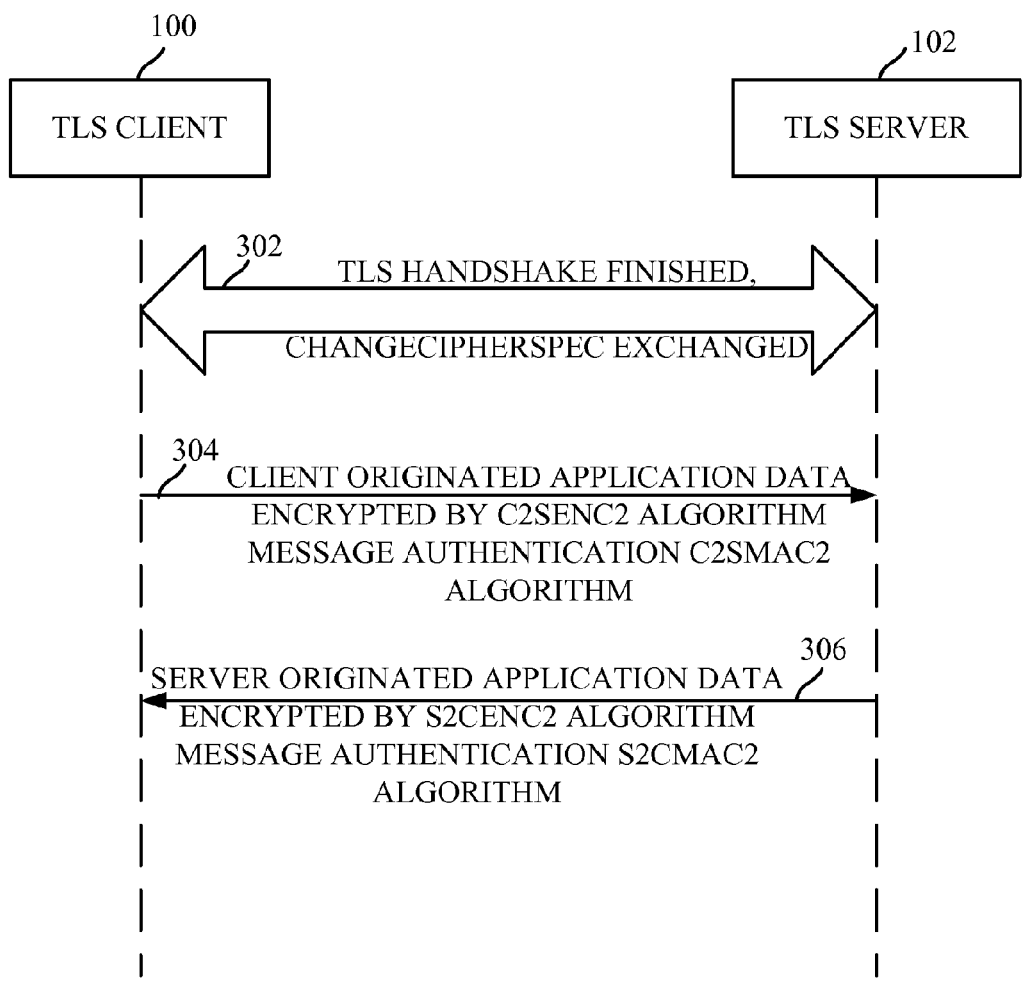
FIG. 5 shows an example of a TLS handshake negotiation, followed by application data exchange between a client and a server.

FIG. 5 shows an example wherein during a TLS handshake negotiation, the so-called 'ChangeCipherSpec' data is exchanged. Next application data 304 is sent by the client 100, and application data 306 in the reverse direction is sent by the server 102. In FIG. 5 the selected algorithms are as follows. The encryption from Client to Server direction, see 304, is C2SENC2, and the MAC algorithm Client to Server direction is C2SMAC2. Likewise, in the reverse direction, see arrow 306, from Server to Client the encryption algorithm is S2CENC2, and the MAC algorithm is S2CMAC2. One of the encryption indicators, e.g. C2SENC2, indicates that the application data is in that direction is not encrypted while the other encryption indicator, e.g. S2CENC2 indicates that in the other direction, the application data is encrypted using encoding algorithm S2CENC2.

According to an aspect a network node 4 in a telecommunication network is provided, see FIG. 2, acting as a firewall or gateway. The network node 4 comprises a receiver 42 for receiving the server handshake message 106 from the network node 2, and a processor 41 configured to process the server handshake message 106.

Figure 6:
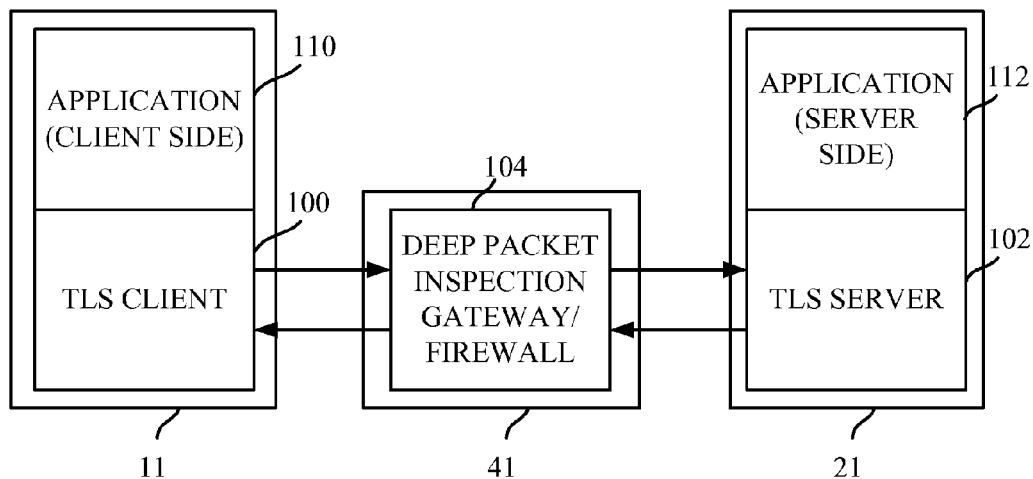
FIG. 6 shows a TLS Client and a TLS Server together with an intermediate gateway/firewall functionality according to an embodiment.

FIG. 6 shows the TLS Client 100 and the TLS Server 102, together with intermediate gateway/firewall functionality 104 loaded on the processor 41. The TLS client 100 functions as a support layer for a client side application 110. The TLS server 102 functions as a support layer for a server side application 112.

The gateway/firewall functionality 104 is configured to monitor and inspect traffic between the communication device land the network node 2 (i.e. the server). Preferably, inspection is desired as deep as possible. Currently if in TLS encryption is set, then deep inspection cannot be performed. But if in only one direction the communication would not be encrypted, the gateway/firewall 104 could monitor this unencrypted (but likely authenticated and integrity protected) communication, while the reverse direction could still remain non-interpretable for the intermediate gateway/firewall 104. It is noted that at present TLS cipher suites are used that result in encryption in both directions or result in no encryption in any direction. In the proposed solution, the gateway/firewall 104 is configured, so as to require that the application data is not encrypted in one direction.

Figure 7:
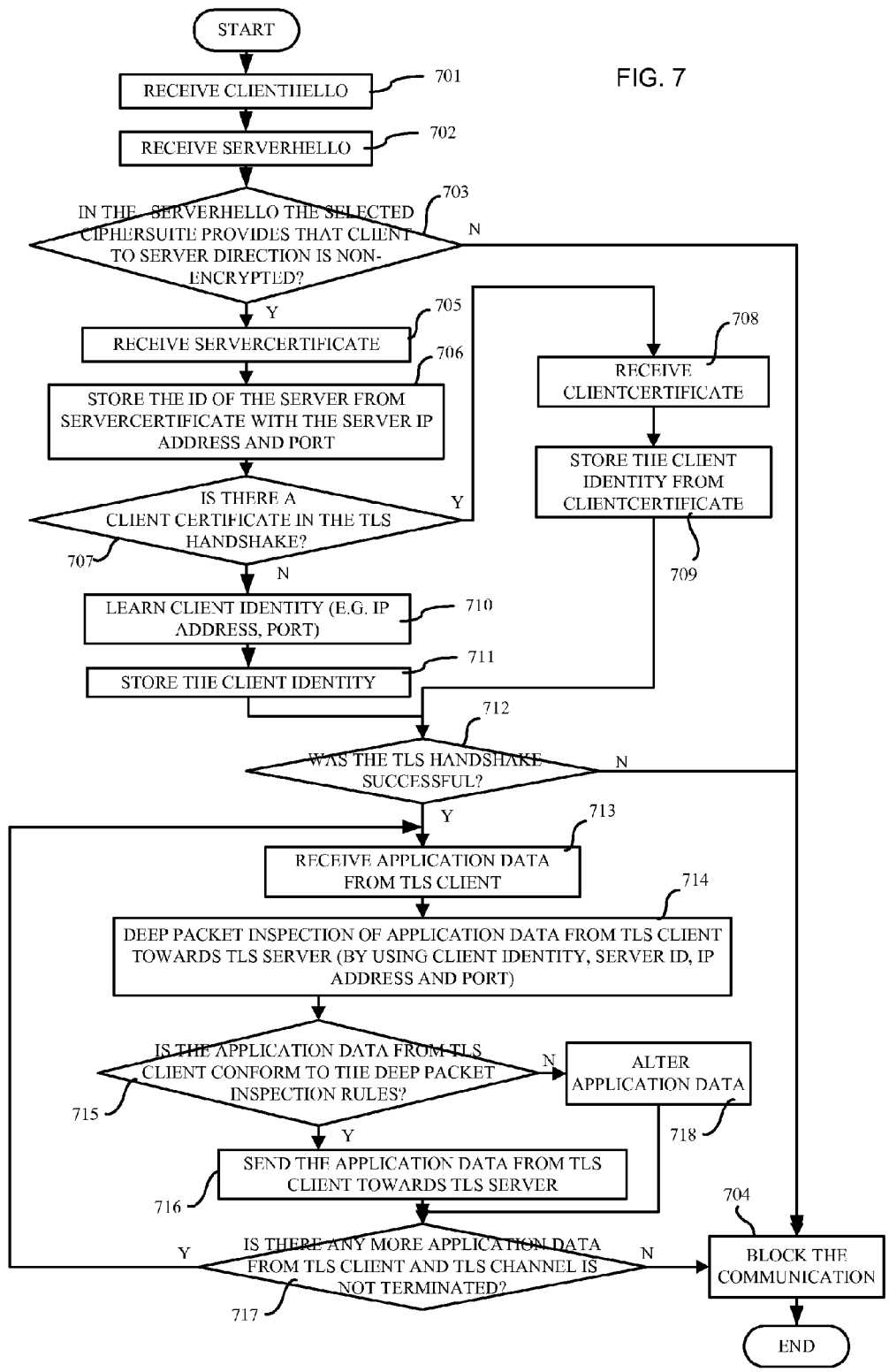
FIG. 7 shows a flowchart of a method performed by the gateway/firewall of FIG. 6 according to an embodiment.

FIG. 7 shows a flowchart of the method performed by the gateway/firewall 104 according to an embodiment. In this example, the application data is readable (i.e. non-encrypted) in the client to server direction by the firewall/gateway 104. Below, the firewall/gateway node 4 is called a gateway, unless the specific properties of a firewall are emphasized.

The method starts with a step 701 in which the gateway receives the TLS ClientHello message and a step 702 in which the ServerHello message is received. Now the gateway has information about what ciphersuite the client and the server agreed upon. The gateway can decide whether the agreed ciphersuite is acceptable. As the gateway is required to perform deep inspection from client to server direction, at least the gateway must make sure that the selected cipher has no encryption in client to server direction, see step 703. Moreover, the gateway may optionally have other requirements on the agreed ciphersuite. Such requirements can be about the cryptographic algorithms of the ciphersuite or about the allowed key lengths of the ciphersuite. If these requirements are not met, then the gateway will refuse the connection, see step 704. Note that the ciphersuite, which agreed by the client and the server is found in the ServerHello message, therefore the gateway does not need to process the ClientHello message, only the ServerHello message.

If the result of test 703 is YES, the method follows with a next step 705 in which the gateway receives the ServerCertificate message, in which the server (i.e. network node 2) presents its certificate. After intercepting the ServerCertificate message, the gateway extracts the server identity, see step 706. The server identity can be extracted from the server's certificate, included in the ServerCertificate message. The IP address and the port of the server 2 may also be stored in addition to the server identity (ID). The identity information extracted from the Server's certificate, the IP address and the port may be used later, during deep packet inspection.

If the gateway receives a ClientCertificate message during the TLS handshake, see test 707 and step 708, it extracts the client identification information from the client's certificate found in the ClientCertificate message, and stores the client ID, see 709. If there is no client certificate in the TLS handshake, the gateway obtains further identity information of the client, e.g. IP address and the port of the client to determine ('learn') the clients ID. The gateway may have other means to learn the identity of the client, for example if the client is a subscriber of a mobile network, the mobile network may notify the gateway about the clients identity.

The TLS handshake method continues with the key exchange of the client and the server. The gateway cannot interpret the TLS key exchange. However the gateway can identify whether the TLS handshake is finished. For the successful completion of the TLS handshake (806) two ChangeCipherSpec messages followed by two encrypted TLS Finished messages needs to be exchanged, originated both from client and server side (see the TLS standard[RFC5246]). Moreover, after exchanging the ChangeCipherSpec and the encrypted TLS Finished messages, alert messages may be received. If alert messages are received by the gateway, or if the TLS handshake is not finished within a reasonable time, the TLS handshake was not successful, see test 712, and the TLS connection will be terminated, see step 704. Otherwise, the gateway is ready to receive application level data, see step 713. The gateway earlier allowed only a ciphersuite, which does not contain any encryption in client to server direction, see test 703, therefore the application data originated from the client 100 is readable for the gateway 104. The application data sent by the server 102 towards the client 100, may be encrypted or the gateway 104 has no interest to inspect, therefore the application data originated by the server 102 is seamlessly forwarded towards the client 100. Note that the gateway 104 may have further firewall (packet filtering) rules specific to any traffic sent or received.

The application data sent by the client 100 is received by the gateway 104. The gateway 104 performs deep packet inspection, see step 714, which means that the entire packet including the application data is inspected. The inspection can be syntactical (to verify all information element are in the correct and allowed range) or semantic. In addition, the server and the client identity can be used during deep packet inspection.

If the application data received by the client 100 is conform to certain predefined deep packet inspection rules, see step 714, 715, it will be forwarded towards to the server 102. Otherwise the connection will be blocked in step 704. In case any more application data arrives from the client 100 and desired to be sent to the server 102, the new application data is inspected in step 714, 715. Otherwise, if there is no more application data, the connection is terminated in step 704. There may be several indications that there will be no more application data from the client side. The client 100 may send a TLS Alert message, according to the TLS standard, indicating that the connection have to be terminated. Similarly, the server 102 may send Alert messages. Moreover, if the connection is dormant for at least a specific time period, configured in the server 102, then any request originated from the client 100 generates an Alert message from the server 102 indicating that the server 102 had already ceased the connection.

Instead of blocking the application data to the server 102, the application data may be altered before it is send to the server 102, see optional step 718. Alteration can be, but is not limited to, changing some data value (i.e. content) by the gateway or changing the routing data to change the destination of the message (forwarding to another node). Such alteration can be advantageous in situations wherein the received, either erroneous, or invalid or malicious traffic is analysed by intrusion detection systems or forwarded to honeypot systems.

Figure 8:
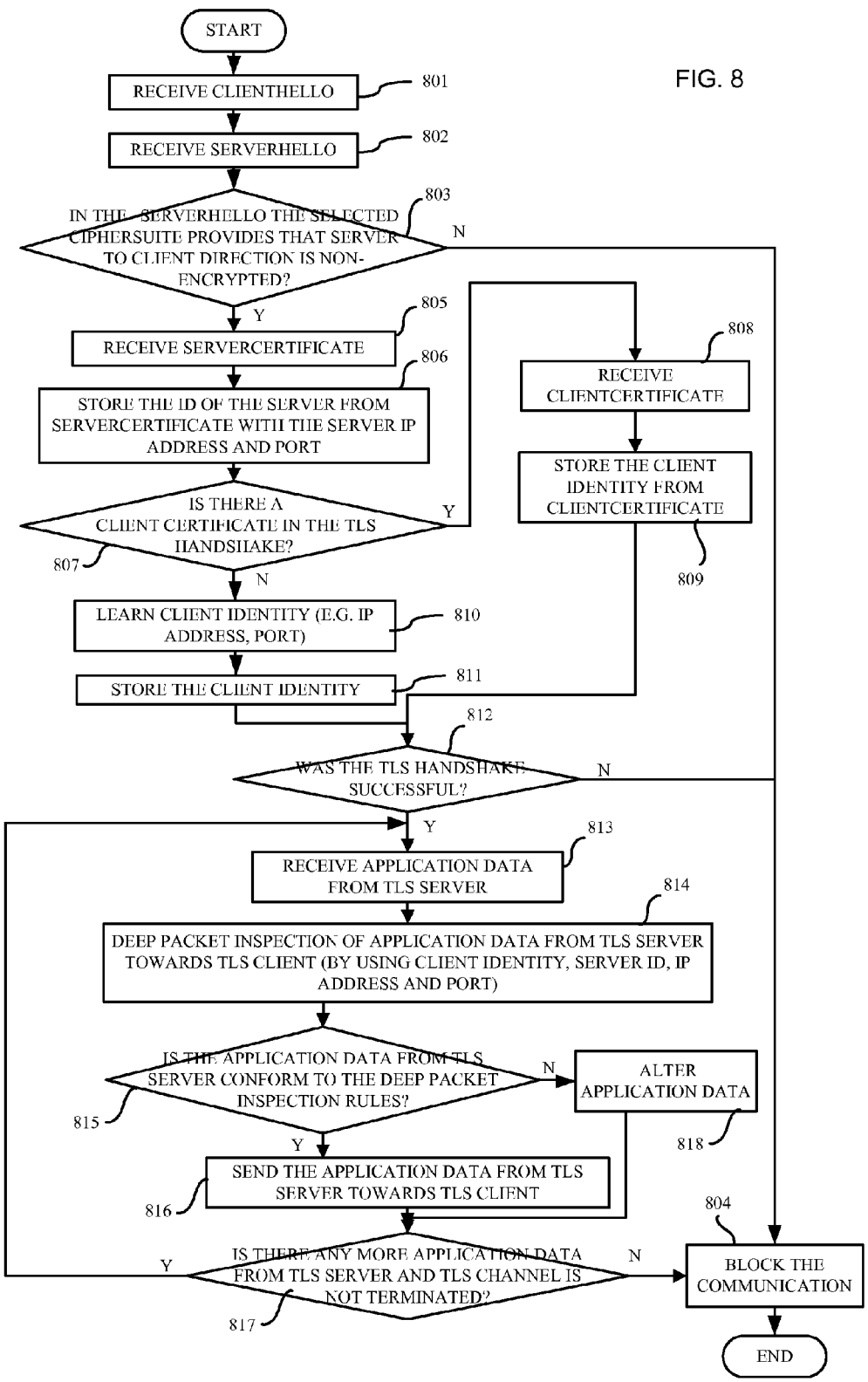
FIG. 8 shows a flowchart of an exemplary embodiment of the method performed by the gateway/firewall of FIG. 6, when the application data is readable in the server to client direction.

FIG. 8 shows a flowchart of an exemplary embodiment of the method performed by the gateway/firewall 104, when the application data is readable in the server to client direction. The deep packet inspection from server to client direction is quite similar to the method shown in FIG. 7 for the reverse direction. The difference is that the TLS Client to TLS Server direction may be encrypted, but the TLS Server to TLS Client direction is not. The client/server role in the TLS layer might be different than the client/server role in the application layer (e.g. a peer might have the server role in TLS layer and client role in the application layer). Examples for such scenarios could be CORBA callbacks. An example where the Server to Client direction can be unencrypted, but the reverse direction is not, could be when a TLS client sends (sensitive) commands or configuration data to a TLS server and the TLS server acknowledges it.

In FIG. 8 the specific differences to the reverse direction as in FIG. 7 are the following. As the gateway 104 is required to perform deep inspection from client to server direction, at least the gateway 104 must make sure that the selected cipher has no encryption in client to server direction; this is tested in step 803. If the TLS handshake is successful, see step 812, the gateway 104 receives application data from the server, see step 813. Then deep packet inspection is performed in step 814. If the application data sent from the server is conform to the predefined deep packet inspection rules, the gateway 104 forwards the application data to the client, see step 816, or it may be altered in a step 818 if the application data is not conform the inspection rules.

In the embodiments described with reference to FIGS. 7 and 8, the gateway 104 performs deep packet inspection of application data only in one direction. The unidirectional deep packet inspection verifies the TLS layer, including the (offered/accepted) cipher suites, server certificate and if exists, the client certificate. The gateway 104 allows the application layer of the client and the server to interact, if the gateway 104 sees that the peers had verified each other (e.g. ChangeCipherSpec and finished messages exchanged and no alert messages are sent). The gateway 104 follows the deep packet inspection at the application layer (in one direction only) when the communication is authenticated and integrity protected only at least in one direction. The unidirectional deep packet inspection does not need to know the shared secrets of the peers. The proposal works in any TLS based secure communication (such as Secure LDAP with startTLS, LDAPs, ftps, https, etc.), regardless TLS is used as underlying layer (such as https) or TLS is used within the application layer (as startTLS in LDAP, FTPs, etc.) Moreover, as there are commonalities in SSL v3.0, TLS 1.0, TLS 1.1, TLS 1.2 DTLS 1.0 protocols, in these protocols the proposal works as well.

As mentioned above, the deep packet inspection can be syntactical or semantical. As an example for syntactical deep packet inspection, the client request is verified whether it follows the application layer protocol. For example in HTTP as application layer protocol, in the application data (in the HTTP GET message) the <\HEAD> tag precedes the <BODY>. As an example for semantic deep packet inspection, an LDAP query can only be sent after successful bind to a LDAP server. Please note that the advantage of the proposed solution is beyond the above mentioned syntactical or semantic verification. For deep packet inspection, the identities of the peers can be used as well. Since the TLS handshake is exchanged successfully between the client 100 and the server 102, the client 100 has identified unambiguously the server 102 and in case a 'ClientCertificate message' is used, the server 102 unambiguously identifies the client. Moreover, if in both directions message authentication is used, then the peers know that the received messages are authentic, and sent by the remote party.

The gateway 104, based on the messages it receives, is also aware that the client 100 has identified unambiguously the server 102. In case a ClientCertificate message is used, the gateway 104 is aware that the server 102 has identified unambiguously the client 100. The gateway 104 is further aware, based on the messages it receives, and if in both directions message authentication is used, that the peers know that the received messages are authentic.

If the client 100 does not have a certificate, or the client's certificate is not used in the TLS negotiation, in most cases the client identity cannot be identified unambiguously. However, in some certain cases the IP address does determine the client's identity. For example, in a mobile network, the IP address of a user equipment, thus the relation between the user equipment and the IP address is known by the mobile network.

In case the client identity cannot be identified unambiguously by the gateway 104, which means, that the client 100 is not authenticated at all, or the client 100 is authenticated, however the gateway 104 is not aware of the procedure and/or the result, the gateway 104 may consider the client identity as unknown. In that case, the gateway 104, during deep packet inspection of the application data, may evaluate the application data as it was originated from an unknown source. For example, if the client 100 sends a request to obtain some information from the server 102, or to demand some resources of the server 102, the gateway 104 may only forward the request, if such requests from unidentified sources are allowed.

In the following two scenarios are described in which the proposals above can be used. It is noted that there may be other scenarios as well, which benefit from the proposal that the TLS encryption is customized in the different directions. In a first scenario Telecommunication network nodes connect to a centralized LDAP server in OSS in the management plane. The Telecommunication network nodes are situated outside the OSS. The OSS perimeter is guarded by a firewall of the OSS. As Telecommunication network nodes are outside of the OSS, inbound LDAP requests need to be allowed. As the LDAP server contains sensitive information about the operators, the leak of such sensitive information needs to be prevented by filtering the LDAP requests in a firewall. In case the LDAP is protected by TLS (LDAPs used), a state of the art firewall is unable to filter as the communication is not readable by the firewall.

Figure 9:
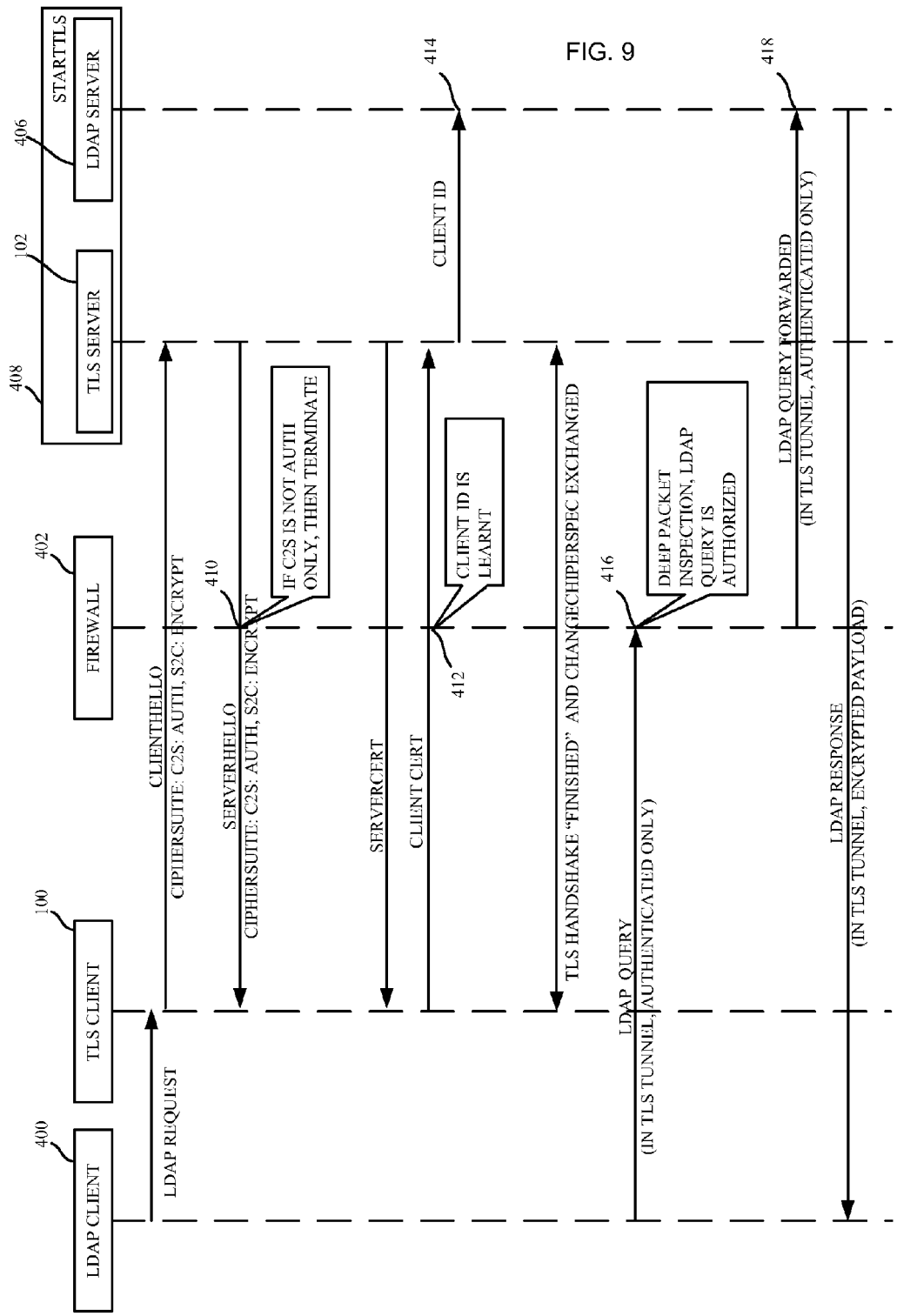
FIG. 9 is a sequence chart showing communication between a LDAP client and a LDAP server according to an embodiment.

The Telecommunication network nodes (e.g. BSCs, MSCs), may use secure LDAP (LDAP with startTLS) for accessing Authentication and Authorization information. The LDAP clients (the BSC, MSC nodes) are situated outside of the protected O&M domain of the OSS. The LDAP server is situated inside of the protected O&M domain of the OSS. Therefore at the perimeter firewall, inbound LDAP communication needs to be opened towards the LDAP server. This pose security risk, which needs to be addressed. FIG. 9 is a sequence chart showing communication between a LDAP client 400 and a LDAP server 406 via a TLS client 100, a firewall 402 and a TLS server 102. In this example a node in startTLS mode 408 is also depicted, however for the example, the startTLS mode might not be necessary. This example may be generalized to be applicable for LDAP with startTLS and for LDAPs (LDAP over TLS) as well. For that reason, in FIG. 9 the LDAP client 400 and the server side 408 possess TLS clients 100 and TLS servers 102 as well, though the way (i.e. startTLS or LDAPs) is not detailed. The LDAP server 406 and the TLS server 102 are situated within the internal network, as will be discussed in more detail with reference to FIG. 10. When the LDAP client 400 wants to query some data from the server 406 it first triggers a setup of a TLS channel, see the LDAP request. This means that the TLS client 100 and the TLS server side exchanges ClientHello and ServerHello messages. The firewall 402 as the Client-server communication goes through it, may intercept the ServerHello message, see 410, and it can decide whether the agreed ciphersuite is acceptable for it. In an embodiment at least in the ciphersuite in the Client to server direction, the communication must be unencrypted (thus e.g. authentication only) otherwise the firewall 402 terminates the connection.

Then the next steps are the exchanges of Server and Client certificates. Upon receiving the Server Certificate the firewall 402 learns (i.e. acquires information on) the identity of the server 406. Likewise, upon receiving the ClientCertificate, see 412, the firewall 402 learns the identity of the Client 400. When the firewall 402 forwards the ClientCertificate message to the TLS server 102, it also learns the identity of the client 400. The TLS client 100 and the TLS server 102 will then finish the TLS handshake and are ready to process the application data.

In LDAP the so-called Implicit startTLS method (see e.g. Chapter 5.2.3.1 of the [RFC4513] standard) using the SASL external mechanism as in [RFC4422] provides that the LDAP client 400 is bound to the LDAP server 406 as the name is specified in Client certificate, see 414. Therefore the LDAP Client 400 can issue an LDAP query, which is, due to the firewall behaviour, not encrypted; it can only be authenticated. When this message arrives to the firewall 402, see 416, the firewall 402 can perform deep packet inspection to decide whether the query is allowed by the firewall security rules. If it is allowed, the firewall 402 may forward the traffic to the LDAP server 406, see 418, or otherwise it drops the traffic (blocks the connection). The response to the query may then sent by the LDAP server 406. This communication is encrypted.

Figure 10:
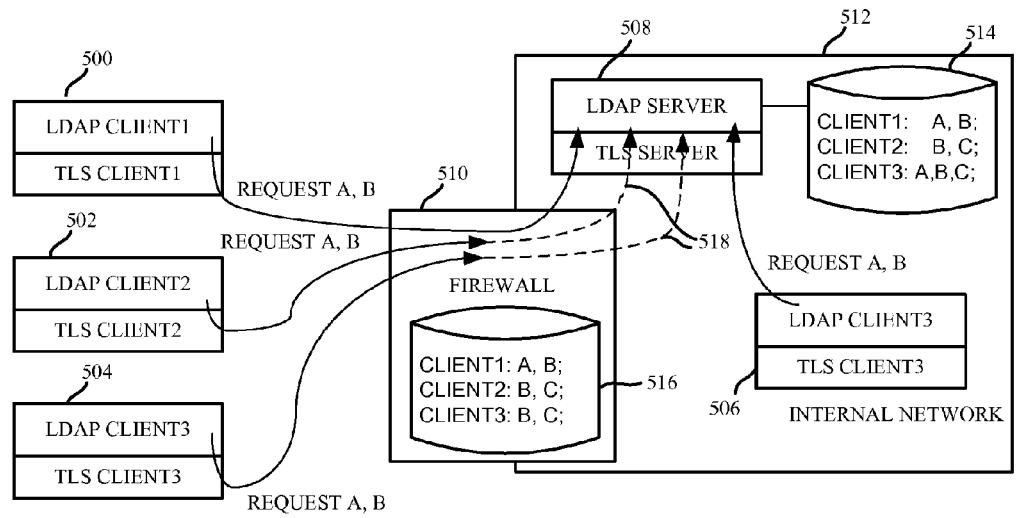
FIG. 10 schematically shows part of a telecommunication network according to an embodiment.

FIG. 10 schematically shows part of a telecommunication network according to an embodiment to further explain the first scenario by way of an example. An LDAP server 508 is situated within an internal network 512, which is protected by a firewall 510 at the perimeter. The LDAP server 508 has its own authorization database 514. The authorization database 514 of the LDAP server 508 in this example shows that a Client1 500 is allowed to get information A and B, a Client2 502 is allowed to query information B and C and a Client3 is allowed to query information A, B and C. The Client3 can be situated in this example outside, see client 504 and inside, see client 506 of the internal network 512. In the firewall 510, another authorization database 516 is deployed for deep packet inspection of incoming LDAP requests. In the authorization database 516 of the firewall 510, the Client1 500 is allowed to query information A and B, the Client2 502 is allowed to query information B and C similarly as in the LDAP authorization database 514. The Client3 504 in the external network however is able to query information B and C as opposed to the authorization database of the LDAP server 514. Now the situation is discussed wherein each of the clients 500, 502, 504, 506 want to query the information A and B. The request of Client1 500 is allowed by the firewall 510, as the firewall 510 performed deep packet inspection and the request was in line with the authorization database 516 of the firewall 510. If the Client2 502 requests information A and B, then the firewall 510 denies the request as A is not allowed to query by Client2 502. Note that the request does not even arrive to the LDAP server 508 as the firewall 510, after deep packet inspection, blocks the request, see the dashed lines 518.

The Client3 506 inside the internal network 512 is allowed to query information A and B, but the same client outside the internal network 512 (i.e. Client3 504) is only allowed to query Information B and C by the authorization database 516 of the firewall 510. Therefore, the request, after performing deep packet inspection, will be blocked by the firewall 510, see dashed line 518. The authorization database 516 may be maintained by a security administrator of the firewall 510, so as to assure proper execution of the deep packet inspection. The authorization database 516 of the firewall 510 might be entirely different than the authorization database 514 of the LDAP server 508 as at the perimeter; different security policies may be applicable.

Figure 11:
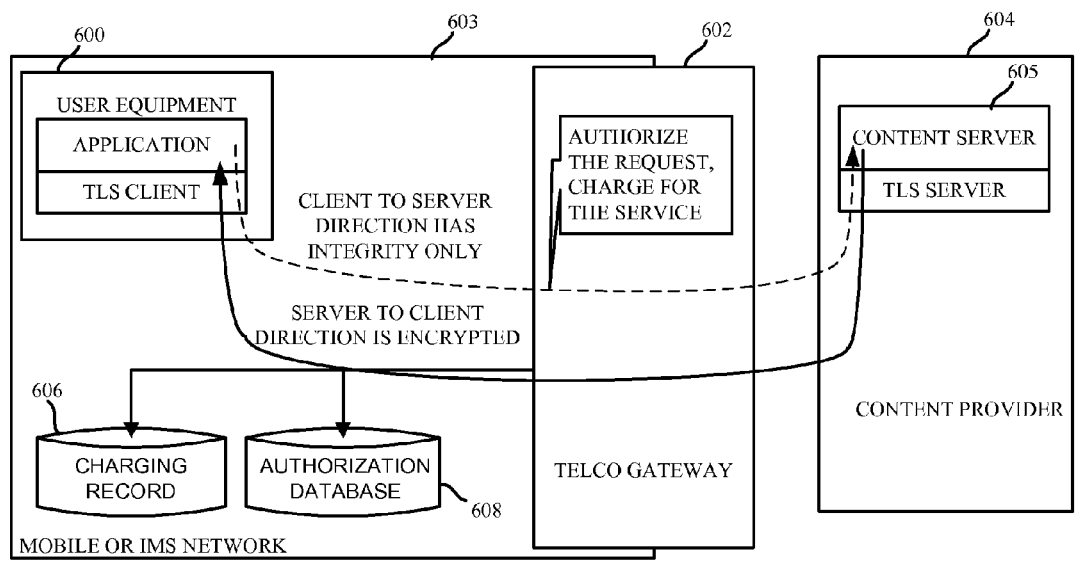
FIG. 11 schematically shows part of a telecommunication network according to a further embodiment.

FIG. 11 schematically shows part of a telecommunication network according to an embodiment to further explain the second scenario by way of an example. In this second scenario, a gateway (e.g. a telecommunication gateway 602) is arranged so as to be able to charge for some content provider service. For that, deep packet inspection at the gateway 602 needs to be performed. In case the content request is protected by TLS, the request cannot be inspected, thus a charging service cannot be realized.

Figure 12:
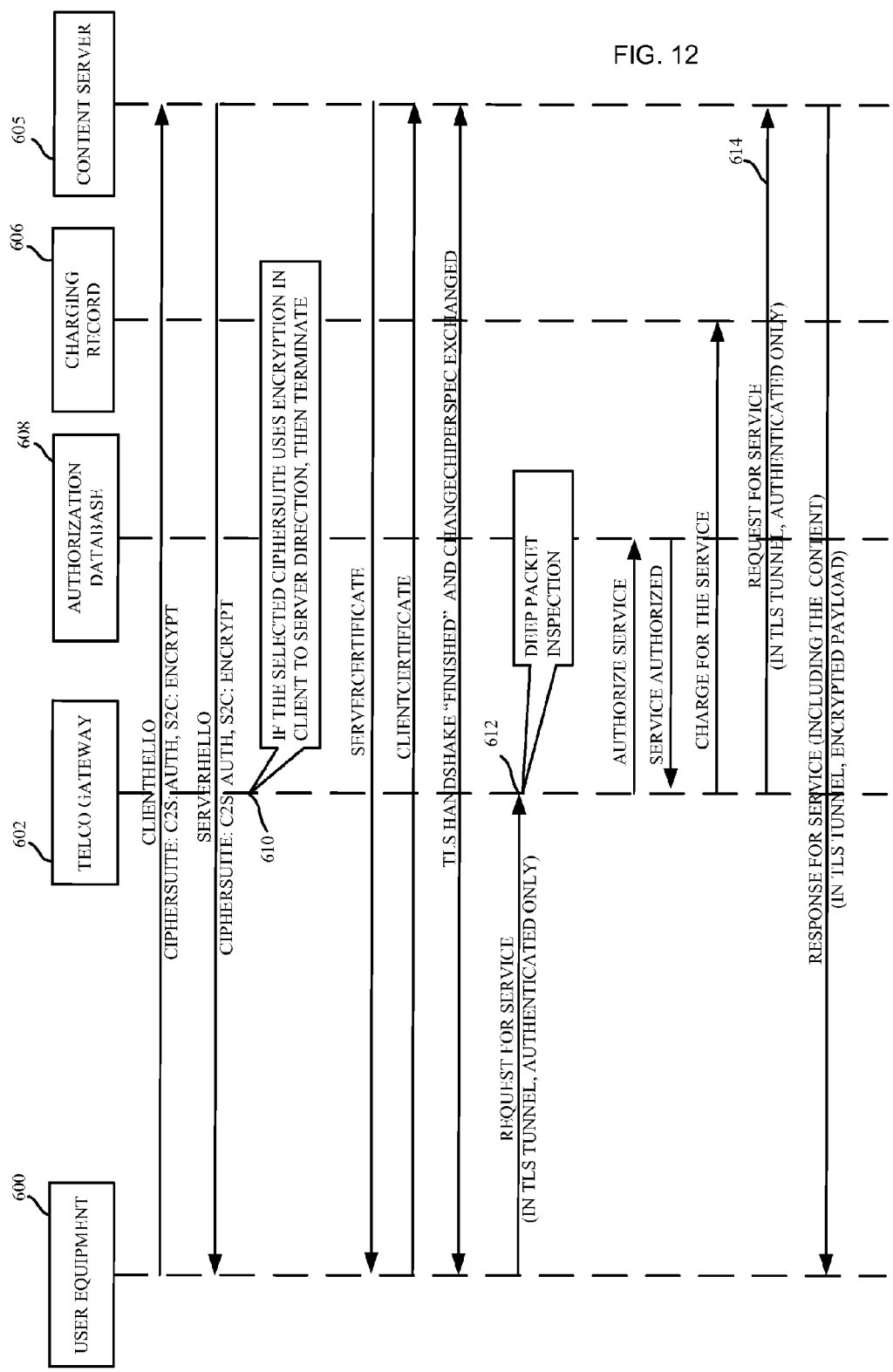
FIG. 12 shows an example of a sequence chart of a communication in the telecommunication network of FIG. 11.

In the example of FIG. 11 subscribers operate their user equipment 600 within an internal network 603 of a mobile operator. The subscribers want to access services of a content server 605 at a remote content provider node 604. To benefit from the subscribers demand, the operator needs to perform authorization, and charging on the subscriber traffic requesting services from the content server 605. Preferably, the authorization decision and charging are independent and distinct from the user equipment 600, as otherwise the subscriber can manipulate the authorization decision and charging information by hacking the user equipment 600. In today's world this security risk is very likely. Therefore the authorization decision and charging logic should not be placed to the user equipment 600. In the embodiment of FIG. 11, the authorization decision and charging are placed onto a telecommunication gateway 602, which handles the traffic between the operator's internal network 603 and external networks. The telecommunication gateway 602 may access an external authorization database 608 and it may send the charging information to an external charging record system 606. Authorization and charging at the telecommunication gateway 602 is possible by means of deep packet inspection of the subscriber's traffic. This means that the traffic originated from the user equipment 600 (the subscriber's request) needs to be readable by the telecommunication gateway 602. According to an embodiment, this is realized by using the proposed TLS ciphersuites which support unidirectional encryption and authentication, while in the reverse direction only authentication is provided. An example of a sequence chart of the solution can be seen in FIG. 12. When the user equipment 600 wants to access some services at the remote content server 605, it initiates a TLS handshake by sending a ClientHello message. The content server 605 responds with ServerHello, containing the selected ciphersuite. The gateway 602 upon receiving the ServerHello, decides that the ciphersuite is acceptable, e.g. in the Client to server direction the ciphersuite does not contain encryption, see 610. In case the ciphersuite is acceptable, the gateway 602 forwards the ServerHello to the client (i.e. the user equipment 600), otherwise the gateway 602 terminates the connection. The TLS handshake continues with the exchange of the certificates. The gateway 602 learns that the subscriber using the user equipment 600 wants to access the content server 605. Optionally the user equipment 600 sends a Client certificate and in that case the gateway 602 will know the identity of the user equipment 600. However the ClientCertificate message may not required since the user equipment 600 is situated within the operator (mobile) network and therefore the operator unambiguously knows the identity of the user equipment 600 and the corresponding subscriber.

The TLS handshake will continue with the key exchange phase and then finishes. In case any error happens during the TLS handshake, the gateway 602 preferably terminates the protocol run to disallow harmful utilization of it. After the TLS handshake, the user equipment 600 sends a request for service to the content server 605. When the telecommunication gateway 602 receives the request, it performs a deep packet inspection, see 612 in FIG. 12. As earlier in step 610 the gateway 602 only allows ciphersuites, which do not use encryption in the client to server direction. As a result, the request for service can be investigated thoroughly, and the request, together with the identity of the user equipment 600 can be authorized.

In the authorization decision, the external authorization database 608 can be used. If the request is granted (authorized) by the gateway 602, the granted request can be recorded in the charging record system 606. If the request is granted, the gateway 602 forwards the original request to the content server 605, see arrow 614. The content server 605, upon receiving the request, will provide the requested service. In case the subscriber (or user equipment) is required to perform further authentication at the content server, the authentication procedure of the content server 605 should be secured, since the TLS layer client to server direction does not provide confidentiality service (encryption). An example for the content service can be Facebook or it can be a secure FTP server utilizing FTPs.

The above described solution is however not restricted to the use of the TLS protocol, other protocols may be used, such as SSL v3.0, TLS1.0, TLS1.1, TLS1.2, DTLS1.0. Furthermore, it is noted that the solution is not restricted to the use of cipher suites as such.

It is emphasized that the present invention can be varied in many ways, of which the alternative embodiments as presented are just a few examples. These different embodiments are hence non-limiting examples. The scope of the present invention, however, is only limited by the subsequently following claims.

ABBREVIATIONS

SSL Secure Socket Layer
TLS Transport Layer security
DTLS Datagram Transport Layer security
UDP User Datagram Protocol
SSH Secure SHell
IPSec IP Security Protocol
MAC Message Authentication Code
SCP Secure Copy (based on SSH)
FTP File Transfer Protocol
sFTP Secure FTP (using SSH)
FTPs FTP over TLS (TLS based FTP)
LDAP Lightweight Directory Access Protocol
PM Performance Management
NETCONF Network Configuration Protocol
OSS Operation Support Subsystem
OSS-RC Operation Support Subsystem-Radio and Core
BSC Base Station Controller
IV Initialization Vector
DH Diffie-Hellman (Key exchange)
DHE,EDH Ephemeral DH
PRF Pseceudo Random Function
LTE Long Term Evolution
CORBA Common Request Broker Architecture
3GPP $3^{rd}$ Generation Partnership Project
HTTP Hypertext Transfer Protocol
IANA Internet Assigned Numbers Authority
OS Operation System
SSLv2 SSL version2
SSLv3 SSL version 3
DSS Asymmetric Algorithm, used for digital signature
RSA Asymmetric Algorithm, used for digital signature and encryption
BSC Base Station Controller
MSC Mobile Switching Centre
BTS Base Transceiver Station
HLR Home Location Register
RNC Radio Network Controller
RBS Radio Base Station
SGSN Serving GPRS Support Node
GGSN Gateway GPRS Support Node
eNB LTE RBS

The invention claimed is:
1. A network node in a telecommunication network, said network node comprising:
a receiver configured to receive a server handshake message from a further network node;
a processor configured to process said server handshake message, said server handshake message comprising:
a first encryption algorithm indicator indicative of a first encryption algorithm proposed for communication from a communication device to said further network node, and a second encryption algorithm indicator indicative of a second encryption algorithm proposed for communication from said further network node to said communication device, said processor being configured to check either said first or said second encryption algorithm indicator, and to block communication between said communication device and said further network node if said checked encryption algorithm indicator is indicating that communication is encrypted.

2. The network node of claim 1, wherein said processor is further configured to:
receive application data from said communication device and/or from said further network node;
perform data inspection of said application data;
block said communication or alter said application data between said client communication device and said further network node, if said application data is not conform to some predefined inspection rules.

3. The network node of claim 2, wherein said processor is configured to alter said application data by way of changing the content of the application data.

4. The network node of claim 3, wherein said processor is configured to alter said application data by way of changing the routing information in the application data.

5. The network node of claim 1, wherein said processor is further configured to:
receive a server certificate;
retrieve an identity of the further network node from said server certificate;
determine a client identity;
perform data inspection using said client identity and said server identity.

6. The network node of claim 5, wherein said processor is further configured to:
check whether a client certificate is present in the server handshake message, and if so:
determine said client identity using said client certificate.

7. A method of operating a network node in a telecommunication network, said method comprising:
receiving a server handshake message from a further network node;
processing said server handshake message, said server handshake message comprising:
a first encryption algorithm indicator indicative of a first encryption algorithm proposed for communication from a communication device to said further network node, and
a second encryption algorithm indicator indicative of a second encryption algorithm proposed for communication from said further network node to said communication device,
checking either said first or said second encryption algorithm indicator, and
blocking communication between said communication device and said further network node if said checked encryption algorithm indicator is indicating that communication is encrypted.

8. The method of claim 7, further comprising:
receiving application data from said communication device and/or from said further network node;
performing data inspection of said application data;
blocking said communication or alter said application data between said client communication device and said further network node, if said application data is not conform to some predefined inspection rules.

9. The method of claim 8, further comprising altering said application data by way of changing the content of the application data.

10. The method of claim 8, further comprising altering said application data by way of changing the routing information in the application data.

11. The method of claim 8, further comprising:
receiving a server certificate;
retrieving an identity of the further network node from said server certificate;
determining a client identity;
performing the data inspection using said client identity and said server identity.

12. The method of claim 11, further comprising:
checking whether a client certificate is present in the server handshake message, and if so:
determining said client identity using said client certificate.

13. A telecommunication system, wherein said system comprises a network node, a further network node and a communication device:
said communication device being configured to create a client handshake message in order to negotiate security settings for a network connection between said device and a network node of said telecommunication network using a transport layer security protocol, said client handshake message comprising:
a first encryption algorithm indicator indicative of a first encryption algorithm proposed by the communication device for communication from said communication device to said network node, and
a second encryption algorithm indicator indicative of a second encryption algorithm proposed by the communication device for communication from said network node to said communication device,
said communication device further comprising a transmitter configured to send said client handshake message to said network node;
said network node being configured to receive said client handshake message, and create a server handshake message comprising said first and second encryption algorithm indicator, wherein one of said first and second encryption algorithm indicator is indicating that communication is non-encrypted while the other of said first and second encryption algorithm indicator is indicating that communication is encrypted;
and said network node being configured to:
receive a server handshake message from said further network node,
process said server handshake message,
check either said first or said second encryption algorithm indicator, and
block communication between said communication device and said further network node if said checked encryption algorithm indicator is indicating that communication is encrypted.

* * * * *

UNITED STATES PATENT AND TRADEMARK OFFICE
CERTIFICATE OF CORRECTION

| | | |
|---|---|---|
| PATENT NO. | : 9,258,278 B2 | Page 1 of 1 |
| APPLICATION NO. | : 14/436741 | |
| DATED | : February 9, 2016 | |
| INVENTOR(S) | : Zömbik | |

It is certified that error appears in the above-identified patent and that said Letters Patent is hereby corrected as shown below:

Title Page, Item (72), under "Inventor", in Column 1, Line 1, delete "Zalaegerszeg (SE)" and insert -- Zalaegerszeg (HU) --, therefor.

In the Specification

In Column 5, Line 45, delete "processor 12" and insert -- processor 11 --, therefor.

In Column 12, Line 24, delete "server 514." and insert -- server 508. --, therefor.

In the Claims

In Column 14, Line 20, delete "IP Security Protocol" and insert -- Internet Protocol Security --, therefor.

In Column 14, Line 31, delete "BSC Base Station Controller".

In Column 14, Line 37, delete "Common" and insert -- Common Object --, therefor.

In Column 14, Line 41, delete "Operation" and insert -- Operating --, therefor.

Signed and Sealed this
Tenth Day of May, 2016

Michelle K. Lee
*Director of the United States Patent and Trademark Office*